United States Patent [19]

O'Dwyer

[11] Patent Number: 5,215,386
[45] Date of Patent: Jun. 1, 1993

[54] GIMBAL BEARING

[75] Inventor: Barry O'Dwyer, Harrisville, N.H.

[73] Assignee: MPB Corporation, Keene, N.H.

[21] Appl. No.: 799,706

[22] Filed: Nov. 26, 1991

Related U.S. Application Data

[63] Continuation of Ser. No. 504,585, Apr. 4, 1990, abandoned.

[51] Int. Cl.⁵ .................. F16C 43/00; G01C 19/16
[52] U.S. Cl. .................... 384/537; 74/5 R; 384/492; 384/585
[58] Field of Search .............. 384/445, 456, 492, 510, 384/513, 516, 537, 559, 584, 585, 907.1; 74/5 R; 464/125, 126, 136, 112

[56] References Cited

U.S. PATENT DOCUMENTS

| | | | |
|---|---|---|---|
| 2,158,156 | 5/1939 | Schröder | 384/492 |
| 2,390,353 | 12/1945 | Bousky . | |
| 2,584,472 | 2/1952 | Konet | 74/5 R |
| 2,727,796 | 12/0955 | Sardou, Jr. . | |
| 3,082,629 | 3/1963 | Jones, Jr. et al. | 74/5.4 |
| 3,336,810 | 8/1967 | Schaffer et al. | 74/5 R |
| 3,446,080 | 5/1969 | Amsler et al. | 74/5 R |
| 3,526,142 | 10/1969 | Fuhr | 74/5 R |
| 3,698,776 | 10/1972 | Litman et al. . | |
| 3,802,275 | 4/1974 | Stripling . | |
| 4,452,654 | 6/1984 | KaDell, Jr. | 156/91 |
| 4,634,300 | 1/1987 | Takebayashi et al. | 384/492 X |
| 4,770,549 | 9/1988 | Rokkaku | 384/907.1 X |
| 4,810,108 | 3/1989 | Yajima | 384/537 X |
| 4,854,750 | 8/1989 | Lavin | 384/584 X |

FOREIGN PATENT DOCUMENTS

| | | | |
|---|---|---|---|
| 211411 | 1/1957 | Australia . | |
| 133064 | 9/1951 | Sweden . | |
| 717349 | 3/1952 | United Kingdom . | |
| 705655 | 3/1954 | United Kingdom | 74/5 R |

Primary Examiner—Thomas R. Hannon
Attorney, Agent, or Firm—Fish & Richardson

[57] ABSTRACT

A gimbal assembly including a first gimbal element; a second gimbal element located within the first gimbal element; a bearing assembly comprising a trunnion, the bearing assembly mounted between the first and second gimbal elements for supporting the second element within the first element in a manner to permit pivoting of the second element within the first element; and an adhesive layer bonding the trunnion to the second gimbal element.

25 Claims, 2 Drawing Sheets

GIMBAL BEARING

This application is a continuation of application Ser. No. 07/504,585, filed Apr. 4, 1990, now abandoned.

BACKGROUND OF THE INVENTION

The invention relates to gimbal bearings.

Gimbal bearings are commonly used in gyroscopes such as are found in the navigational systems of vehicles including, for example, air planes, boats, space vehicles or guided missles. In general, a gimbal bearing is a device which supports another object and permits it to pivot freely within a predetermined range about a point. As part of a gyroscope, the gimbal bearing typically supports a rotor that spins at a high rate of speed. When the rotor is spinning rapidly, it tends to maintain a fixed orientation in space while the orientation of the housing that contains the rotor changes direction as the vehicle in which the housing is mounted moves. The fixed orientation of the rotor provides a convenient reference against which the orientation of the vehicle can be compared to accurately determine the direction of the vehicle.

In airborne applications, which typically impose severe space limitations, it is often desireable that the gimbal bearing be physically small. In addition, it is also often desireable that the gimbal bearing be constructed to withstand extremes in operating conditions. Thus, for example, it often must withstand large acceleration forces and a wide range in operating temperatures.

SUMMARY OF THE INVENTION

In general, in one aspect, the invention features a gimbal assembly including a first gimbal element; a second gimbal element located within the first gimbal element; a bearing assembly, which includes a trunnion, mounted between the first and second gimbal elements for supporting the second element within the first element in a manner to permit pivoting of the second element within the first element; and an adhesive layer bonding the trunnion to the second gimbal element.

In preferred embodiments, the trunnion has an inner race formed in it and the bearing assembly also includes an outer ring having an outer race and a plurality of bearings (e.g. bearing balls) disposed between said inner and outer races. The second gimbal element includes a cylindrical opening which conforms to the trunnion and the trunnion is secured within that opening by the adhesive layer. The trunnion, the plurality of bearings and the outer ring are made of ceramic material. In addition, there is a second adhesive layer that bonds the outer ring of the bearing assembly into a second cylindrical opening in the first gimbal element.

Preferred embodiments also include the following features. The gimbal assembly further includes a gimbal ring for holding the first gimbal element; and a second bearing assembly, which includes a second trunnion, mounted between the first gimbal element and the gimbal ring for supporting the first element within the gimbal ring in a manner to permit pivoting of the first element within the gimbal ring; and a second adhesive layer bonding the second trunnion to the first gimbal element.

One advantage of the invention is that the use of adhesive layers to secure the bearing assemblies to the other gimbal components allows ceramic materials to be used for the bearing assemblies as well as for the other gimbal components. Using ceramics is often desireable because they typically have far greater load capacity than do metals. In addition, ceramics are typically non-magnetic and neither interfere with nor are they affected by the magnetic drive systems used in gyroscopes. Further, if ceramics can be used throughout the gimbal assembly, thermal stresses caused by differences in the thermal expansion coefficients are thus reduced.

Also, using adhesive layers eliminates the need for a flange on the bearing assembly and a screw to secure the bearing assembly onto the trunnion and it permits the bearing to be properly aligned and preloaded during assembly without having to use precisely machined shims and/or flats. This is particularly advantageous in small gimbal assemblies where it may be desireable to use ceramic materials but the machining required for conventionally designed bearing assemblies may prove to be impractical with ceramics. The adhesive further provides a certain amount of stress relief at the attachment sites between the bearing assembly and the other gimbal components. In addition, the use of a bearing inner race that is integral to the trunnion permits use of a thicker, and thus a stronger, trunnion in comparison to systems in which the inner race is formed in a bearing outer ring that is, in turn, mounted onto a separate trunnion.

Other advantages and features will become apparent from the following description of a presently preferred embodiment and from the claims.

DESCRIPTION OF THE PREFERRED EMBODIMENT

FIG. 2b is an enlarged cross-section of a segment of the gimbal assembly shown FIG. 2a.

Figure 1:
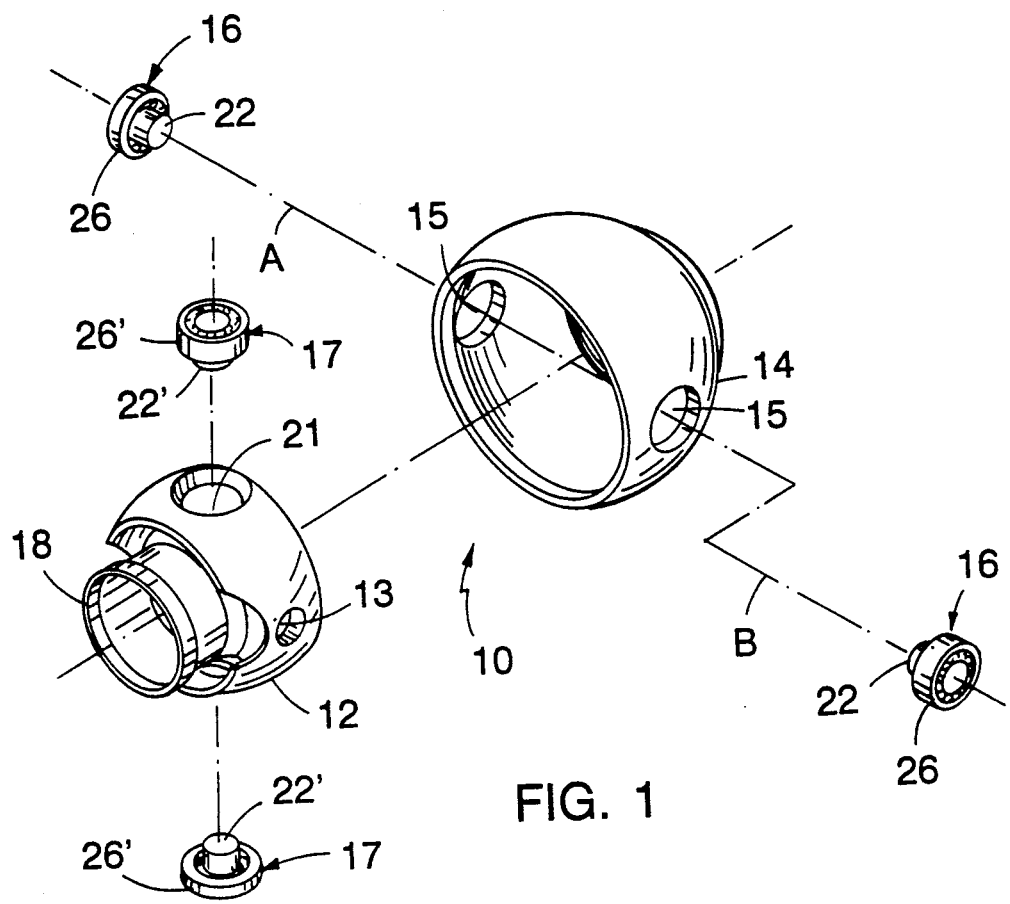
FIG. 1 is an exploded view of a gimbal assembly.

Referring to FIG. 1, a gimbal assembly 10 includes a gimbal ring 14, an outer gimbal element 12 and an inner gimbal element 18, which may be made of either metal or ceramic material (e.g. $Si_3N_4$). Inner gimbal element 18 is supported within outer gimbal element 12 by a first pair of opposed inner bearing assemblies 17 which permit restricted rotation about a first axis, A. Outer gimbal element 12 is, in turn, supported within gimbal ring 14 by a second pair of opposed outer bearing assemblies 16 which permit restricted rotation about a second axis, B, which lies orthogonal to the first axis. Thus, if gimbal ring 14 is held stationary, inner gimbal element 18 has two degrees of rotational freedom and can freely pivot to any orientation within a restricted range.

When in a gyroscope, inner gimbal element 18 typically is designed to hold a rotor (not shown) that can be driven up to a high speed of rotation by an electromagnetic drive system (also not shown). In that case, the inner gimbal element 18 tends to remain in a fixed orientation while gimbal ring 14 changes orientation to follow the movements of the vehicle in which it is mounted.

Outer bearing assemblies 16 are mounted within openings 15 located in gimbal ring 14 and within corresponding openings 13 in outer gimbal element 12. Similarly, inner bearing assemblies 17 are mounted within openings 21 located in outer gimbal element 12 and within openings 23 (hidden in FIG. 1 but visible in FIGS. 2a and 2b) located in inner gimbal element 18. The design of bearing assemblies 16 and 17 and the method of mounting them within their respective openings will now be described in greater detail.

Figure 2B:
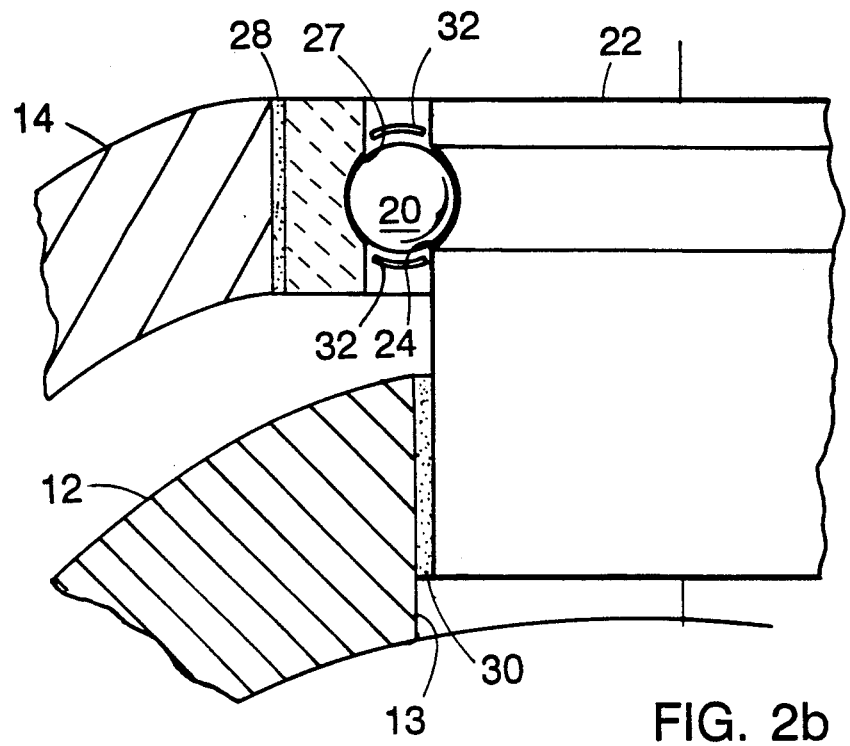
Figure 2A:
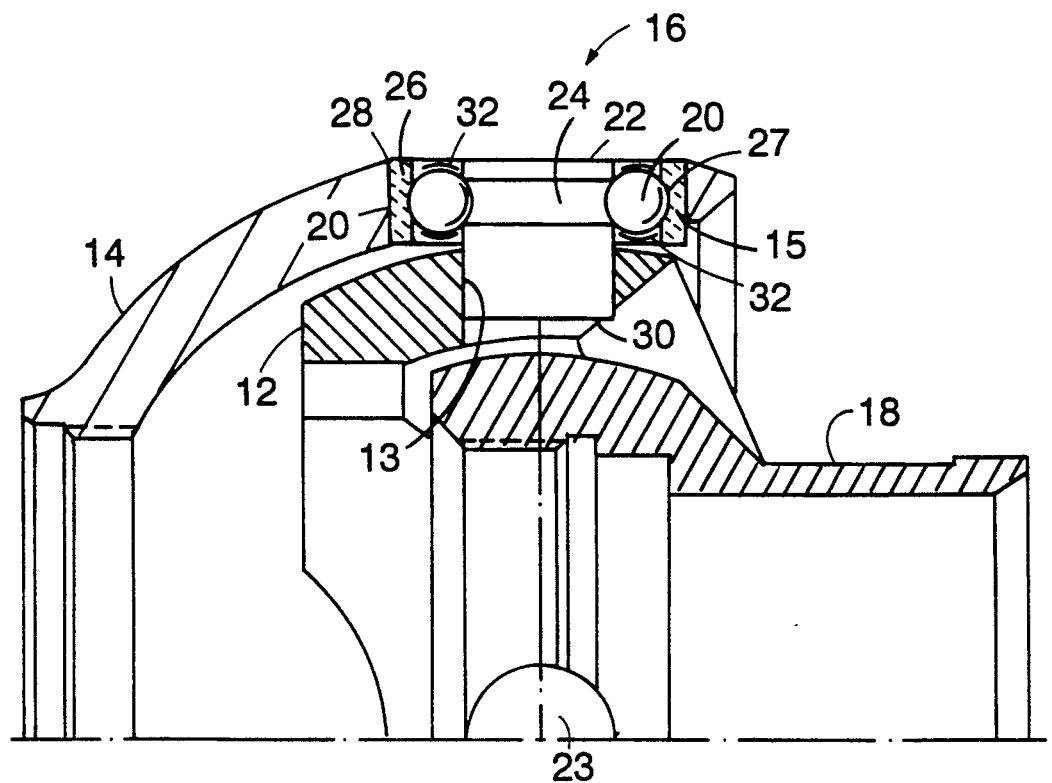
FIG. 2a is one half of a cross-section of the gimbal assembly of FIG. 1 showing the outer bearing assembly.

Referring to FIGS. 2a and 2b, outer bearing assembly 16 includes a trunnion 22, defining about its surface an integral inner race 24, an outer ring 26 defining an outer race 27, and a plurality (e.g., six) of bearing balls 20 that ride within the space defined by the inner and outer races 24 and 27. A copper retainer ring 32 such as is known to those skilled in the art holds bearing balls 20 in a predetermined arrangement about trunnion 22. Trunnion 22 is secured within opening 13 by a layer of adhesive 30 and similarly, outer ring 26 is secured within opening 15 by a layer of adhesive 28 (see below for examples of acceptable adhesive materials).

Figure 3:
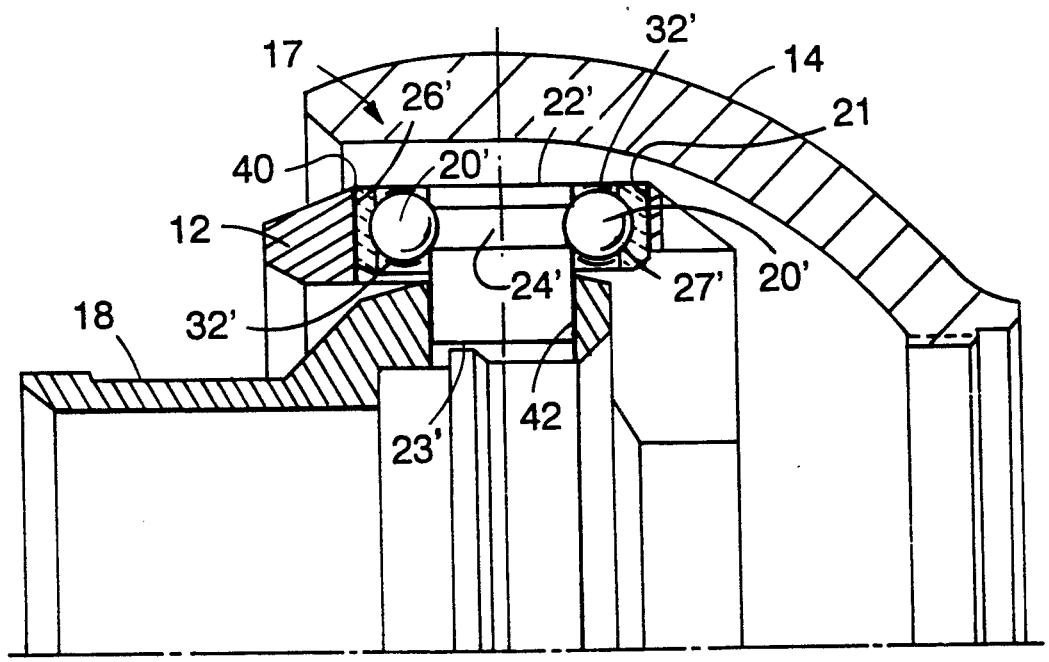
FIG. 3 is one half of a cross-section of the gimbal assembly of FIG. 1 showing the inner bearing assembly.

Inner bearing assemblies 17, which allow inner gimbal 18 to pivot with respect to outer gimbal 12, are essentially identical to outer bearing assembly 16. Referring now to FIG. 3, each inner bearing assembly 17 includes a trunnion 22' with an integral inner race 24', an outer ring 26' with an outer race 27', and six bearing balls 20' that ride within a space defined by inner and outer races 24' and 27'. A copper retainer ring 32' holds bearing balls 20' in a predetermined arrangement about trunnion 22'. Trunnion 22' is secured within opening 23' by a layer of adhesive 42 and similarly, outer ring 26' is secured within opening 21' by a layer of adhesive 40 (see below for examples of acceptable adhesive materials).

The particular adhesive which is used for adhesive layers 28, 30, 40 and 42 depends upon the anticipated stresses and range of conditions within the environment in which gimbal assembly 10 will operate. For example, adhesive strength of some adhesives can be significantly affected by the operating temperature. Thus, the selected adhesive should perform satisfactorily over the entire temperature range which gimbal assembly is likely to experience. Suitable adhesives include, for example, Aremco Bond 631 made by Aremco Products, Inc.; Master Bond EP30 made by Master Bond, Inc.; and Hysol 956 made by the Dexter Adhesives and Structural Materials Division of Hysol, Inc. Based upon knowing the conditions under which the gimbal assembly will operate, one skilled in the art would be able to select the appropriate adhesive to use.

In the described embodiment, trunnions 22 and 22', outer rings 26 and 26' and bearing balls 20 and 20' are made of $Si_3N_4$. More specifically, trunnion 22 and outer ring 26 are Cerbec NBD100 (HIP) material and bearing balls 20 are Cerbec NC-132 (HP) material. (Cerbec refers to material and components available from the Cerbec Ceramic Bearing Co. located in East Granby Ct.) Because of the hardness of $Si_3N_4$, it is desireable to use diamond particle tools to perform the grinding and polishing of the bearing parts during their fabrication.

Gimbal assembly 10 may be constructed using outer rings 26 and 26' having outside diameters which are less than 0.5 inch. In the described embodiment, the overall dimensions of gimbal assembly 10 are approximately 0.75 inch. The diameter of trunnions 22 and 22' are nominally 0.0919 inch and the diameter of openings 13 and 23 are nominally 0.0920 inch. The outside diameter of outer rings 26 and 26' are nominally 0.1874 inch and the diameter of openings 15 and 21 are nominally 0.1875 inches. And bearing balls 20 and 20' are about 1 millimeter in diameter.

Using adhesive layers 28 and 30 to secure outer and inner bearing assemblies 16 and 17 to the corresponding gimbal elements permits greater clearances between the bearing assembly components and the openings into which they are mounted as compared to conventional mounting methods. Indeed, in order to get enough adhesive between the bearing and the wall of the opening into which it is being mounted so that it forms a sufficiently strong bond, it may be desireable to not have the fit be too tight. During assembly and before the adhesive is allowed to cure, an alignment fixture or jig (not shown) may be used to establish and maintain the required alignment and preloading until curing is complete. Because of the greater flexibility permitted by using an adhesive, even radial clearances of 0.0002 inch for the above-mentioned parts may not be excessive.

Other embodiments are within the scope of the following claims.

What is claimed is:

1. A gimbal assembly comprising
   a first gimbal element;
   a second gimbal element located within said first gimbal element;
   a first trunnion;
   a first adhesive layer bonding said first trunnion to said second gimbal element; and
   a first bearing assembly mounted between said first gimbal element and said first trunnion for supporting said second element within said first element in a manner to permit pivoting of said second element within said first element.

2. The gimbal assembly of claim 1 wherein an inner bearing race is formed in said first trunnion and said first bearing assembly comprises an outer ring defining an outer bearing race and a plurality of bearing elements disposed between said inner and outer bearing races.

3. The gimbal assembly of claim 2 wherein said plurality of bearing elements comprises bearing balls.

4. The gimbal assembly of claim 2 wherein said first trunnion comprises a ceramic material.

5. The gimbal assembly of claim 4 wherein said plurality of bearing elements and said outer ring each comprises a ceramic material.

6. The gimbal assembly of claim 5 wherein the outside diameter of the outer ring is less than 0.5 inch.

7. The gimbal assembly of claim 5 wherein said first and second gimbal elements each comprises a ceramic material.

8. The gimbal assembly of claim 2 further including a second adhesive layer bonding the outer ring of said first bearing assembly to said first gimbal element.

9. The gimbal assembly of claim 8 wherein said first gimbal element defines an opening sized to receive said outer ring and wherein said outer ring is secured within said opening by said second adhesive layer.

10. The gimbal assembly of claim 9 wherein said opening has a cylindrical shape.

11. The gimbal assembly of claim 1 wherein said second gimbal element defines an opening sized to receive said first trunnion and said first trunnion is secured within said opening by said first adhesive layer.

12. The gimbal assembly of claim 11 wherein said opening has a cylindrical shape.

13. The gimbal assembly of claim 1 further comprising:
   a gimbal ring, said first gimbal element mounted within said gimbal ring;

a second bearing assembly comprising a second trunnion, said second bearing assembly mounted between said first gimbal element and said gimbal ring for supporting said first element within said gimbal ring in a manner to permit pivoting of said first element within said gimbal ring; and a second adhesive layer bonding said second trunnion to said first gimbal element.

14. The gimbal assembly of claim 13 wherein said second trunnion defines an inner bearing race and said second bearing assembly further comprises an outer ring defining an outer bearing race and a plurality of bearing elements disposed between said inner and outer bearing races of said second bearing assembly.

15. The gimbal assembly of claim 14 wherein said plurality of bearing elements comprises bearing balls.

16. The gimbal assembly of claim 14 wherein said second trunnion comprises a ceramic material.

17. The gimbal assembly of claim 16 wherein said plurality of bearing elements and said outer ring each comprises a ceramic material.

18. The gimbal assembly of claim 17 wherein the outside diameter of the outer ring is less than 0.5 inch.

19. The gimbal assembly of claim 17 wherein said first and second gimbal elements and said gimbal ring each comprises a ceramic material.

20. The gimbal assembly of claim 14 further including a third adhesive layer bonding the outer ring of said second bearing assembly to said gimbal ring.

21. The gimbal assembly of claim 20 wherein said gimbal ring defines an opening sized to receive the outer ring and wherein the outer ring is secured within said opening by said third adhesive layer.

22. The gimbal assembly of claim 21 wherein said opening has a cylindrical shape.

23. The gimbal assembly of claim 13 wherein said first gimbal element defines an opening sized to receive said second trunnion and said second trunnion is secured within said opening by said second adhesive layer.

24. The gimbal assembly of claim 23 wherein said opening has a cylindrical shape.

25. A gimbal assembly comprising
a first gimbal element;
a second gimbal element located within said first gimbal element;
a gimbal ring, said first gimbal element mounted within said gimbal ring;
a first trunnion including an inner bearing race formed therein;
a first adhesive layer bonding said first trunnion to said second gimbal element, wherein said second gimbal element defines a first opening sized to receive said first trunnion and said first trunnion is secured within said first opening by said first adhesive layer;
a first bearing assembly comprising a first outer ring defining an outer bearing race and a first plurality of bearing elements disposed between the inner bearing race of said first trunnion and the outer bearing race of said first bearing assembly, said first bearing assembly mounted between said first gimbal element and said first trunnion for supporting said second element within said first element in a manner to permit pivoting of said second element within said first element;
a second adhesive layer bonding said first outer ring to said first gimbal element, wherein said first gimbal element defines a second opening sized to receive said first outer ring and said first outer ring is secured within said second opening by said second adhesive layer;
a second trunnion including an inner bearing race formed therein;
a third adhesive layer bonding said second trunnion to said first gimbal element, wherein said first gimbal element defines a third opening sized to receive said second trunnion and said second trunnion is secured within said third opening by said third adhesive layer;
a second bearing assembly comprising a second outer ring defining an outer bearing race and a second plurality of bearing elements disposed between said inner bearing race of said second trunnion and the outer bearing race of said second bearing assembly, said second bearing assembly mounted between said second trunnion and said gimbal ring for supporting said first element within said gimbal ring in a manner to permit pivoting of said first element within said gimbal ring;
and
a fourth adhesive layer bonding said second outer ring to said gimbal ring, wherein said gimbal ring defines a fourth opening sized to receive said second outer ring and said second outer ring is secured within said fourth opening by said fourth adhesive layer.

* * * * *